July 3, 1956
H. H. SCHOTT
2,753,472
MOTOR CONTROL FOR ELECTRIC FOOD MIXER
Filed Dec. 8, 1952
3 Sheets-Sheet 1
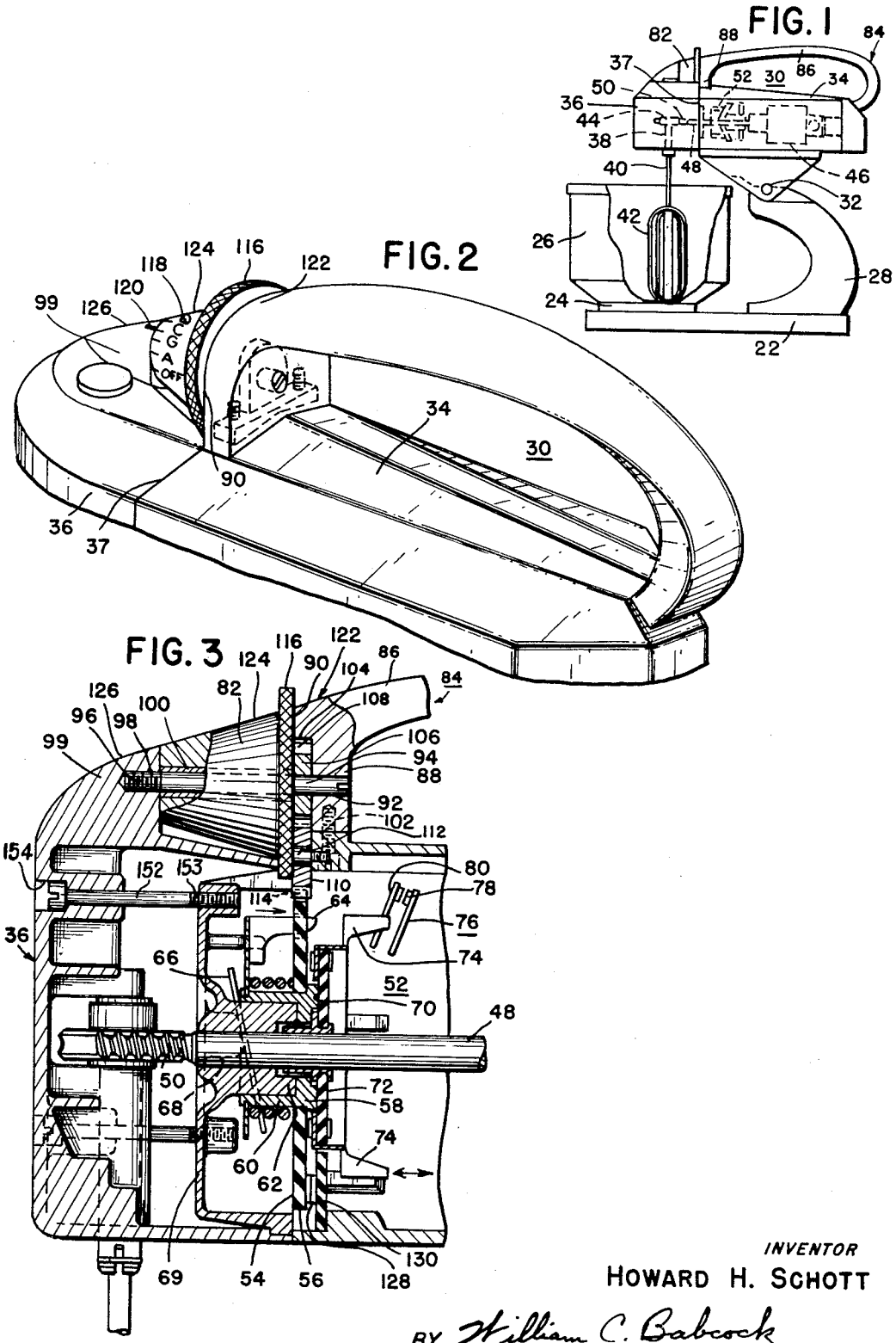
INVENTOR
HOWARD H. SCHOTT
BY William C. Babcock
ATTORNEY July 3, 1956 H. H. SCHOTT 2,753,472
MOTOR CONTROL FOR ELECTRIC FOOD MIXER
Filed Dec. 8, 1952 3 Sheets-Sheet 2

INVENTOR
HOWARD H. SCHOTT
BY William C. Babcock ATTORNEY

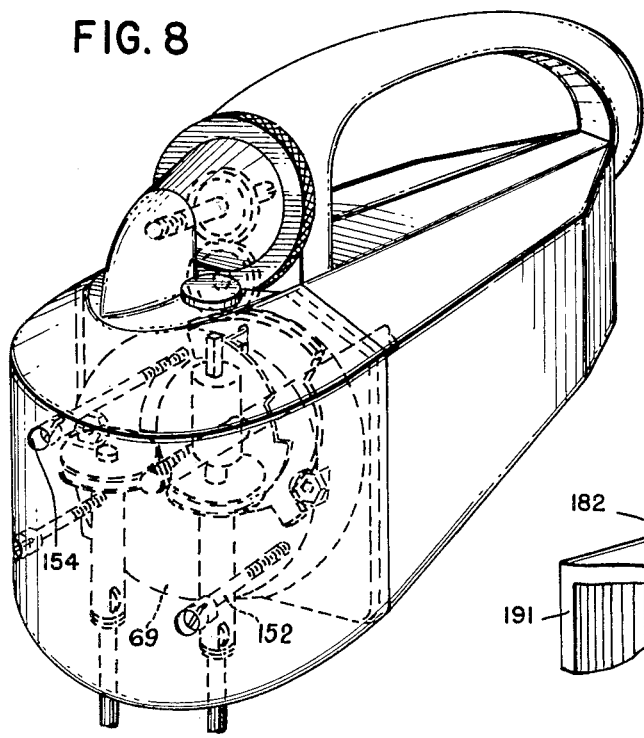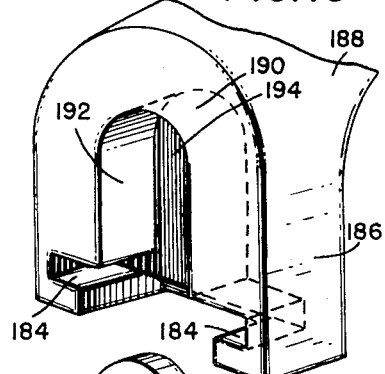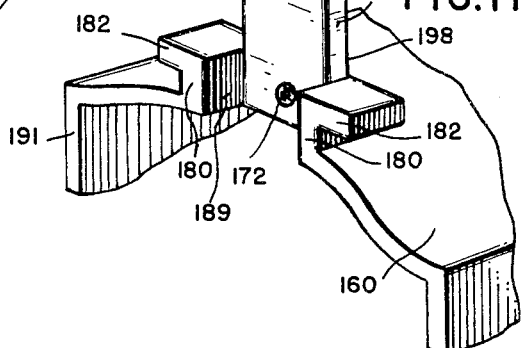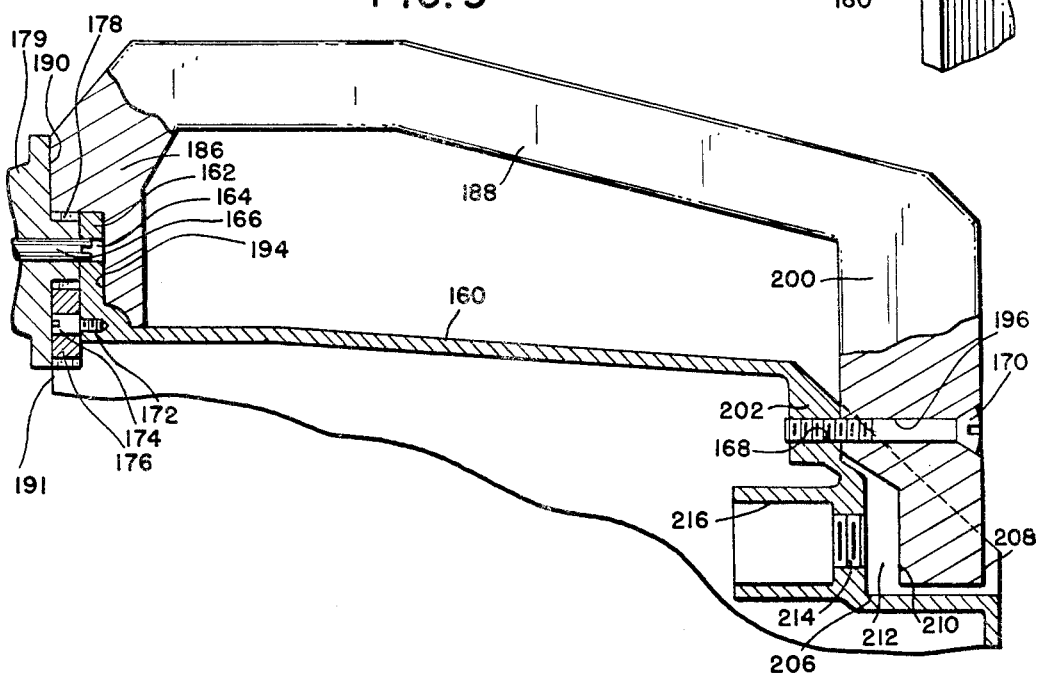
INVENTOR
HOWARD H. SCHOTT
BY William C. Babcock ATTORNEY United States Patent Office 2,753,472
Patented July 3, 1956

2,753,472

MOTOR CONTROL FOR ELECTRIC FOOD MIXER

Howard H. Schott, St. Paul, Minn., assignor, by mesne assignments, to Illinois McGraw Electric Co., a corporation of Illinois Application December 8, 1952, Serial No. 324,621

15 Claims. (Cl. 310—50)

The present invention relates to household food mixers and more particularly to an improved speed control mechanism for such a mixer.

Household food mixers are known in which a motor and gear casing is carried by a suitable support and provided with beaters which project into a mixing bowl carried on the support. Such mixers customarily have electric motor means provided with some sort of governor or speed control mechanism which may be adjusted to provide different mixing speeds. An external, manually operable control knob is generally provided for the adjustment of the speed control mechanism to set the desired speed of operation.

It is one object of the present invention to provide an improved speed control device for a food mixer.

Another object is the provision of an improved location and orientation of a speed control knob on a food mixer.

A further object is the provision of a speed control knob in such a position that a broad range of speed adjustment indicia is visible at all times to the operator.

A further object is the provision of a speed control knob in convenient association with a carrying handle on a household food mixer.

Still another object is the provision of a control knob located immediately ahead of the handle of a mixer and rotatable on an axis substantially parallel to the main gripping portion of the handle.

A further object is the provision of such a speed control mechanism and handle assembly at the plane of separation between the motor casing and gear housing portions of such a food mixer.

Another object is the provision of an improved handle assembly for such a food mixer.

Other objects and advantages will be apparent from the following specification in which a preferred embodiment of the invention is described. In the drawings which accompany this application, Figure 1 is a side elevation, with certain portions broken away for clearness, of a food mixer incorporating speed control means according to the invention.

Fig. 2 is an enlarged partial perspective view of the handle and control knob portions of the device of Fig. 1.

Fig. 3 is an enlarged partial side view with portions broken away and other portions shown in section to illustrate details of the speed control mechanism and connections.

Fig. 8 is a perspective view of the assembled motor casing and gear housing showing details of their connection.

Fig. 9 is a side view partly in section, of a modified handle and knob assembly.

Fig. 10 is a partial perspective view of the front end of the handle of Fig. 9, and Fig. 11 is a similar view of the front end of the motor casing of Fig. 9.

Figure 4:
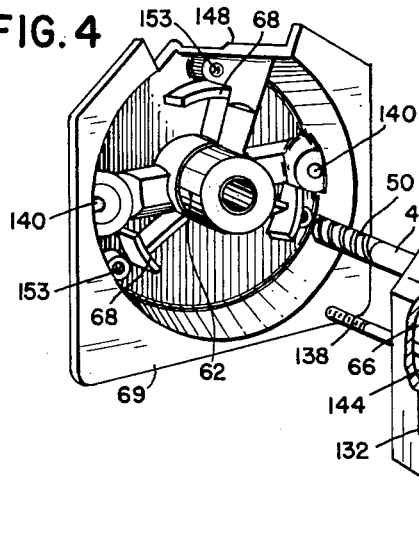
Fig. 4 is a perspective view of the end cap and bearing member of the motor casing.

As shown in Fig. 1, the present invention is used in a food mixer indicated generally at 20. This mixer has a base 22 with a bowl support 24 at one end thereof. A mixing bowl 26 is mounted on this bowl support. At the other end of base 22 is a pedestal 28 on which the power unit 30 is supported. The connection between the power unit 30 and pedestal 28 may include a pivotal connection at 32. It is customary in some forms of construction for this pivotal connection to be disengaged readily when it is desired to remove the power unit from the pedestal and operate it as a portable mixer at a stove or other location.

The power unit itself includes a motor casing 34 and gear housing 36 which are joined to each other along a plane indicated by the separation line at 37 extending generally transversely of the power unit. Within the gear housing 36 at the forward end of the power unit one or more beater drive shafts 38 are rotatably mounted. Beater shafts 40 are detachably connected to the drive shafts 38 and carry at their lower ends beaters 42 for projection into the mixing bowl 26 and engagement with the contents thereof.

Figure 7:
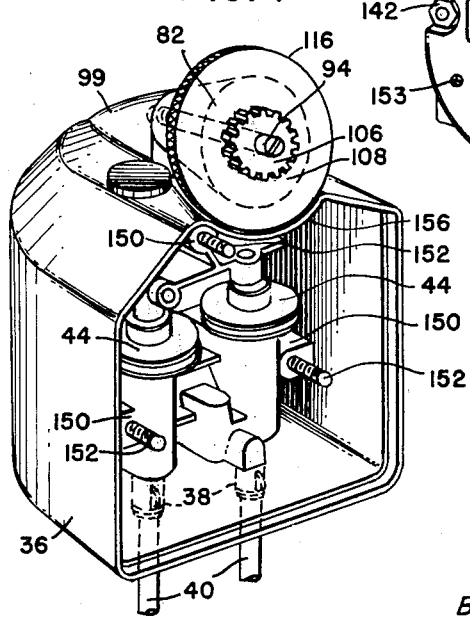
Fig. 7 is a perspective view of the gear housing designed for assembly with the motor casing of Fig. 6.

Gear housing 36 also includes worm gears 44 on the ends of the beater drive shafts 38. These gears are driven by a suitable power source such as an electric motor indicated schematically at 46. This motor has a shaft 48 extending longitudinally of the power units 30 and projecting forwardly from the motor casing 34 into the gear housing 36. A worm 50 at the forward end of motor shaft 48 engages the worm gears 44 on the beater drive shafts to provide the desired operation of the beaters. As shown in Fig. 7, the present gear housing includes two beater drive shafts with a worm gear on each, and the worm 50 of the motor shaft 48 is then received between the two worm gears and in engagement with each of them.

Within the motor casing 34, the power unit is provided with suitable speed control mechanism in the form of a governor indicated generally at 52. In this particular construction, the governor mechanism 52 is located at the forward end of the motor casing 34 between the main body portion 46 of the motor and the projecting worm gear 50. While various types of known speed control mechanisms or governors may be used in combination with the present invention, I prefer to use a device having a control member rotatable coaxially of the motor shaft 48. Such a control member is shown at 54 in Fig. 3 in the form of a fibre or insulating disk. This disk is rotatably supported in the motor casing 34 by engagement of portions at the edges of the disk with suitable seating surfaces 56 in the edges of the motor casing. These seating surfaces are concentric with the axis of motor shaft 48 and thus permit rotation of the adjusting disk 54 coaxially of the motor shaft.

Control disk 54 has a central opening therein which accommodates a rotatable and axially movable adjusting sleeve 58. This sleeve 58 has an annular body portion 60 which is rotatably and slidably supported on the bearing portion 62 at one end of the motor shaft 48. Thus the sleeve member 58 is also rotatable coaxially of the motor shaft 48 and at the same time is slidable longitudinally thereof. This adjusting sleeve or member 58 is provided at its forward end with a spider which carries rearwardly extending projections 64 engageable in slots 65 (Fig. 5) in a control disk 54. These slots and projections provide for rotation of the adjusting sleeve member 58 in response to rotation of the control disk 54, and at the same time permit relative axial movement of the sleeve 58 without change in the axial position of disk 54. This desired axial or adjusting movement of the sleeve is obtained in response to rotation of the sleeve by virtue of cam surfaces 66 rigidly projecting radially from the sleeve 58 at its forward end. These cam surfaces 66 engage cam projections 68 on the inner surface of the cover plate 63 of motor casing 34. This cover plate 63 serves as an inner or end cap for the motor casing and also carries the bearing portion 62 for the forward end of motor shaft 48.

Axial movement of the adjusting sleeve 58 in response to rotation of the control disk 54 causes corresponding axial movement of a disk 72 along the motor shaft. Disk 72, in turn, carries rearwardly extending projections 74 for engagement with one of the contact arms 76 of the governor switch mechanism. This contact arm 76 has a contact 78 cooperating with a corresponding contact on a second switch arm 80. These contact arms are supported on motor shaft 48 and tend to separate and break the motor circuit at a speed which depends on the axial location of the projections 74, and thus, in turn, on the rotary position of the adjusting disk 54. Additional details of this specific type of governor mechanism are fully described in Nielsen Patent 2,109,732, to which reference is made for structural details not shown herein.

In the present case, the control disk 54 corresponds essentially to the rotatably mounted indicator disk 28 of the above patent, except for the means for actuation of the disk which will now be described.

According to the present invention, a manually operable, externally accessible control knob 82 is mounted in a particular manner ahead of the power casing handle assembly. This handle assembly includes a handle 84 having a main handgrip portion 86 which is substantially parallel to the motor shaft 48 and general longitudinal axis of the motor casing. The handle also includes a front supporting post portion 88 which projects upwardly from the motor casing and merges smoothly with the handgrip portion at its upper end. This handle post 88 has a substantially flat forward wall or surface 90 facing toward the gear housing end of the appliance. Specifically, this flat handle surface or wall portion 90 extends transversely of the motor shaft 48 and power unit casings in substantially the same plane as the line of separation 37 between the motor casing and gear housing portions of the power unit. The handle assembly includes suitable handle post retaining means securing the front handle post to the casing. This retaining means includes the integral upwardly extending flange or retaining member 144 on the motor casing, and screws 102.

The handle assembly is also provided with a bearing portion or opening 92 for supporting one end of a control shaft 94 on which the control knob 82 is mounted. In this embodiment, the bearing portion 92 is in the front handle post 88. The other end of the control shaft 94 is threaded at 96 and is received in an internally threaded bearing portion 98 in a suitable projection 99 of the gear housing. In the present case, the control knob 82 is provided with a bushing 100 so that it is rotatably supported on shaft 94 and this shaft, in turn, is fixed in position by means of the threads 96. Other forms of construction could obviously be used, such as an arrangement in which the knob and shaft are integrally connected and the shaft is then rotatably supported at both ends in the respective bearing portions.

Since the handle assembly is secured to the motor casing portion of the power unit adjacent the line of separation between the motor casing and gear housing, it will be understood that the control knob shaft 94 has its respective bearing portions in separable parts of the power unit. Thus assembly and disassembly of the device are facilitated, since separation of the gear housing from the motor casing automatically disengages at least one end of the control knob shaft from its associated bearing portion.

The front wall 90 of the handle post 88 is preferably recessed as shown at 104 to receive and conceal a toothed gear 106 secured to the control knob 82. This gear and its teeth may, if desired, be molded integrally of plastic material with the remainder of the control knob 82. The teeth 108 on gear 106 mesh in driving engagement with the teeth of an intermediate idler gear 110. This idler gear 110 is supported on a stub shaft 112 which may be formed as an integral projection on the motor casing 34. The teeth of idler gear 110 mesh, in turn, with integral driving teeth 114 on the rotatable control disk 54.

Thus the rotation of the control knob 82 will result in rotation of control disk 54 by means of the intermediate gearing at 106 and 110.

To facilitate the manual operation of control knob 82, the knob is provided with a peripheral portion 116 of increased diameter immediately adjacent the front wall 90 of the handle post 88. This projecting periphery extends outwardly from the surface of the handle and of the remainder of the knob sufficiently far to be readily engaged by the thumb or forefinger or thumb and forefinger of a person grasping the main handgrip portion 86. The body portion of control knob 82 is also provided with a range of speed-indicating indicia at 118 for cooperation with a suitable index mark 120 on the gear housing bearing projection 99. Because the arrangement just described locates the axis of the control knob shaft between the motor shaft and the gripping portion of the handle, and particularly since this control knob shaft location is spaced outwardly above the power unit casing (i. e., between such casing and the axis of the handgrip portion), a major portion of the control knob will be exposed to the view of the operator. Thus a substantial portion of the range of speed indicia 118 will be visible at all times so that the operator can tell readily which way to turn the knob to get from one specified setting to another. This is particularly advantageous where the indicia 118 are set forth in terms of particular mixing operations, such as creaming, whipping, mashing, and the like, where it is not always obvious which way to turn the knob to get from one indication to the other.

As illustrated particularly in Figs. 2 and 3, the shape of the front handle portion, particularly the handle post, is coordinated with the shape of the control knob and of the front bearing portion 99 on the gear housing so as to provide a smoothly tapering forward surface interrupted only by the projecting peripheral portion 116 of the knob. The upper portion 122 of the handle post, and the upper portion 126 of the gear housing bearing projection 99 are formed as surfaces of revolution around the axis of control knob shaft 94, with the diameters of the surfaces of revolution immediately adjacent the control knob substantially coinciding with the surface generated by the conical surface of revolution 124 of the main body portion of the control knob itself. Thus, in side profile, as shown in Fig. 3, there is a smooth and continuous downward taper from the handgrip portion along the control knob to and including the bearing projection on the gear housing. The circular upper portion 122 of the handle post also facilitates operation of the device by exposing a substantial portion of the control knob periphery 116, which is of greater radius of revolution than the handle post portion 122. In this way the periphery 116 of the control knob projects slightly at each side of the appliance and all around the upper portion for greater accessibility by the user.

In order that the control knob 82 may also provide a positive "off" position for the power unit, the control disk 54 may be provided with a contact strip 128 (Fig. 3) cooperating with a similar contact strip on an insulating member 130 fixed in the casing adjacent the control disk.

Figure 5:
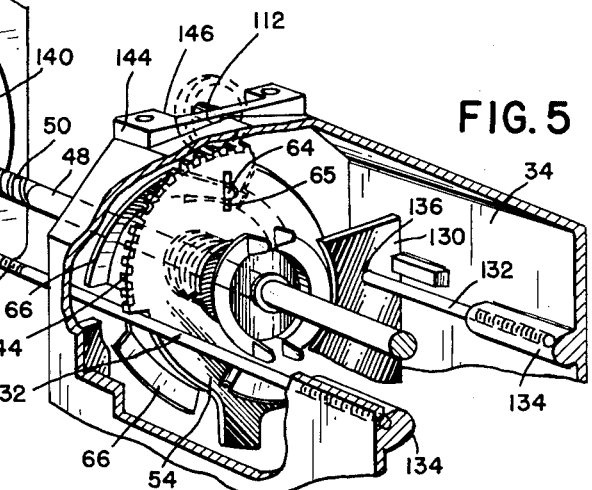
Fig. 5 is a partial perspective view with portions broken away for clearness, showing the motor casing in position for assembly with the end cap.

Figs. 4 through 8 illustrate the manner in which the control mechanism according to the present invention is assembled and disassembled and emphasize the importance of the preferred form of the invention in which the handle post adjacent the control knob lies substantially in the plane of separation between the motor casing and gear housing of the power unit. Fig. 4, for example, shows details of the construction of the end cap and bearing member 69 of the motor casing 34. This figure particularly shows the central bearing portion 62 which serves both as a bearing for the end of motor shaft 48 and also as an internal bearing for the axially movable adjusting sleeve 58. This view also shows more clearly the cam projections 68 which cause axial movement of the adjusting sleeve in response to rotation of the control disk 54. Fig. 5 shows additional details of the motor casing 34, including one means for securing the end cap to the motor casing. In this case, the unit is provided with longitudinally extending assembly rods 132 which are threaded at one end into suitable bosses 134 in the motor casing. Certain elements of the assembly may be assembled on these rods as, for example, the insulated switch plate 130 which is provided with a suitable opening 136 for this purpose. The governor brushes and, if desired, the motor stator may also be assembled on rods 132.

These rods are threaded at their forward ends as shown at 138 and are designed to pass through openings 140 in suitable bosses on the end cap 69. Nuts 142 engage the threaded ends of rods 132 as shown in Fig. 6 to hold the end cap 69 in assembled position and provide a front bearing for the motor shaft 48.

As also shown in Fig. 5, the motor casing 34 may have an integral upwardly extending projection 144 at its upper forward end to provide a mounting face or retaining member for the lower end of the handle post. This projection 144 and the corresponding portions of the casing 34 are recessed at 146 corresponding to the handle recess 104 (Fig. 6) to accommodate the intermediate idler gear 110 on its stub shaft 112. The end cap 69 may also be cut away as shown at 148 in Fig. 4, to assist in accommodation of the idler gear and associated control member portions.

Figure 6:
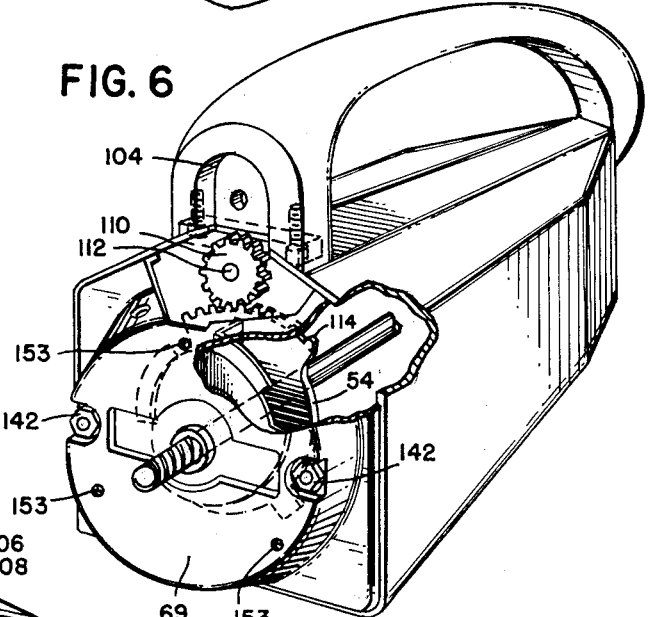
Fig. 6 is a front perspective view of the motor casing and end cap in assembled position.

As shown in Fig. 6, the idler gear 110 may be assembled on the stub shaft 112 in meshing engagement with teeth 114 of the control disk 54 at the time the end cap 69 is secured.

Fig. 7 illustrates in perspective the gear casing, with its vertical beater drive shafts 38 and their worm gears 44. This gear housing includes suitable bosses 150, in this case three in number, which have longitudinally extending openings through which threaded bolts 152 may project for assembly of the gear housing to the motor casing. The heads of these bolts are received in suitable countersunk recesses at 154 (Figs. 3 and 8) in the front of the gear housing, while the bolts themselves engage threaded openings 153 in the motor casing end cap 69.

As shown in Fig. 7, the control knob 82 may be assembled with its shaft 94 on the gear housing by threading the shaft 94 into the bearing projection 99 before the gear housing is assembled to the motor casing. The parts are so arranged with the control knob shaft 94, idler shaft 112, and motor shaft 48 all extending longitudinally and parallel to each other, that the gear housing may be assembled to the motor casing by a simple telescoping operation.

It will also be noted that the gear housing 36 is depressed at 156 in its top wall in a somewhat conical shape to accommodate the lower portion of the conical control knob 82. This depressed portion permits the top wall of the gear housing to come slightly above the lower portion of the control knob periphery and give a clean-cut appearance to the knob arrangement, without interference with the accessibility of the major portion of the control knob.

According to the foregoing description, the simple telescoping assembly and disassembly of the gear housing and motor casing parts as just described are further facilitated by the location of the front handle post on the motor casing immediately adjacent the line of separation between the parts, and particularly, by arrangement of the front face of the handle post in the same plane as the line of separation. The rear end of the handle may be secured to the rear of the motor casing in the manner described below in connection with the modification of Figs. 9–11, or in some equivalent manner.

A modified form of construction according to the present invention is illustrated in Figs. 9, 10, and 11. This modification particularly concerns a preferred form of handle assembly, which cooperates effectively with the speed control knob arrangement. Specifically, the construction provides an arrangement by which the handle can be added as the last item of assembly after the motor casing, gear housing, and control knob have been previously assembled and the rear motor shaft bearing adjusted to the desired extent.

As shown in Fig. 9, the motor casing 160 is substantially similar to the motor casing previously described, except for the modifications discussed below in connection with mounting of the front handle post. In the present case, the upper surface of the motor casing adjacent the line of separation is provided with a handle post retaining member which includes an upwardly and laterally extending integral flange 162. This integral upwardly projecting flange 162 is preferably provided with a longitudinally extending opening 164 in alignment with the end of the speed control knob shaft 166. Thus, even though the control knob shaft 166 is threaded into a projection on the gear housing as in the embodiment described in Figs. 1 through 8, so as to be self-supporting during assembly, the rear end of the shaft 166 may project rearwardly past the rear face and gear portion of the control knob in order to project at least partially into the bearing opening 164 when the control parts are assembled. In this way, the rear end of the control knob shaft 166 will be provided with a bearing support in part of the handle assembly.

Near the level of the top wall of motor casing 160, this flange portion 162 is also provided with an internally threaded opening 172. This opening 172 receives a threaded extension on a stub shaft 174 which supports the intermediate or idler gear 176 of the governor control mechanism. This idler gear 176 is driven by integral gear teeth 178 on the rear of the speed control knob 179, and in turn drives the rotatable governor control member inside the motor casing just as in the previous embodiment.

To secure the front handle post firmly against radial or upward movement, the handle post retaining member also includes further integral upwardly extending projections 180 which run somewhat longitudinally of the casing at each side of the laterally and upwardly extending flange 162. These longitudinal and vertical flange portions 180 are provided at their upper ends with horizontal outwardly extending lugs 182 designed for interlocking engagement with corresponding recesses 184 on the front handle post 186 of handle 188.

As illustrated particularly in Fig. 11, the vertical flange 162 has its front face offset rearwardly from the line of separation 191 between the motor and gear casing. The length of this offset, as shown by the longitudinally extending flange portion 189 of Fig. 11, is just great enough to accommodate the idler gear 176 and the integral gear teeth 178 of the speed control mechanism, so that the rear face of the control knob 179 itself may lie substantially flush against the forward edge of flanges 180, i. e., in the same plane as the plane of separation 191 between the motor housing and gear casing.

Similarly, as shown in Fig. 10, the front wall 190 of the handle post is recessed at 192 to accommodate not only the gears just mentioned but also the vertical flange portion 162 of the handle post retaining member. Thus the front wall 190 of the handle post can also lie in the plane of separation at 191 between motor housing and gear casing. The depth of this recess 192 in the handle post is just sufficient so that the rear surface 194 of the recess will lie closely against the rear edge 198 of the vertical flange 162 and thus determine the longitudinal position of the handle post.

From the foregoing description it will be understood that the handle post 186 and its notches 184 are designed for assembly with the flange 162 and lugs 182 of the handle post retaining member by a relative telescoping movement longitudinally from the rear toward the front of the motor housing in a direction generally parallel to the motor shaft. This relative forward movement is limited by engagement of the wall portions 194 and 198 of the handle post and flange 162 respectively. The parts are then secured against reverse movement by insertion of the bolt or retaining member 170 as described below.

To secure the rear of the handle 188, a rear handle post 200 is provided which extends downwardly to the rear end of the motor casing. A longitudinal opening 196 in this rear handle post is designed to receive the retaining member or bolt 170. This bolt extends forwardly through the hole and into an internally threaded hole 168 in the boss 202 of motor casing 160. Thus the front handle post is first secured to the lugs 182 by a telescoping movement from rear to front. Bolt 170 will then be inserted and will serve to carry the weight of the rear portion of the assembly. The bolt will also retain the parts against reverse movement and thus maintain both the front and rear handle posts in their assembled positions.

The rear of the motor casing 160 is recessed as shown at 206 to accommodate the lower end of the rear handle post 200 and provide a substantially smooth or continuous outer surface where the lower end 208 of the handle post finally meets the casing.

Within this recessed portion 206, the front wall of the rear handle post 200 is cut away as at 210 to provide a space or chamber 212 for the adjusting member (not shown) of the motor shaft bearing. This adjusting member is designed for threaded engagement with the opening 214 in axial alignment with the motor shaft. The motor shaft itself is supported in a self-aligning bearing (not shown) located in the cylindrical bearing portion 216 formed as an integral part of the motor casing 160.

By virtue of the construction just described, the motor casing and gear housing may be separately assembled as previously described, but with the handle completely removed. A control knob will be assembled with the gear casing, and the idler gear 176 will be assembled with the motor casing.

The second step in the assembly will then involve the connection of the motor and gear casings to each other, as described above, and the concurrent engagement of the control knob 179 and idler gear 176 by longitudinal telescoping movement during the assembly. With the parts thus secured, the motor can be adjusted and both the speed control mechanism and rear motor shaft bearing properly positioned. As a last step in the assembly handle 188 may then be telescoped into position from the rear and secured in the manner above described.

The foregoing specification describes certain preferred embodiments of the invention which can be economically and easily constructed and assembled and which substantially accomplish the objects set forth at the beginning of this specification. Since minor variations and changes in the exact details of construction will be apparent to persons skilled in this field, it is intended that this invention shall cover all such changes and modifications as fall within the spirit and scope of the attached claims.

Now, therefore, I claim:

1. A household food mixer comprising a motor casing having a motor and motor shaft therein, a handle assembly including a handle attached to the casing, said handle having a hand-grip portion generally parallel to the motor shaft, a supporting post at one end of said hand-grip portion, and means securing said supporting post to the motor casing and spacing said hand-grip portion therefrom, a gear housing mounted on said casing substantially at one end of said casing, a control shaft mounted at said one end of said hand-grip portion of the handle substantially parallel to said hand-grip portion and supported at one end by said housing and at the other end supported adjacent said handle, a manually rotatable control knob mounted on the control shaft adjacent the hand-grip portion, said handle assembly having a bearing portion supporting the control knob directly adjacent one face of said post, motor governor means within the casing providing a range of adjustment of the motor speed, and means operatively connecting the control knob and governor means to each other within the casing for controlling the motor speed in response to manual rotation of said knob.

2. A household appliance comprising a motor casing having a motor therein, a removable housing at one end of the casing, a handle having a handle post secured to the casing adjacent the housing and a hand-grip portion extending from the handle post generally parallel to the casing on the side of the post facing away from the housing, a bearing portion on the housing spaced forwardly from the handle post, a manual control knob assembly having one end supported by the bearing portion and the other end extending toward the post for rotation of the knob on an axis extending from the bearing portion toward the post substantially parallel to said hand-grip portion, with the knob located adjacent the handle post and between said post and bearing portion.

3. A household appliance according to claim 2 in which said handle post has a bearing portion supporting the other end of said manual control knob assembly, said control knob assembly being automatically disengaged from at least one of said bearing portions by removal of the housing from the casing.

4. A household appliance comprising a motor casing having a motor and a motor shaft extending longitudinally therein, a removable housing at one end of the casing and shaft, said housing being removable in a direction generally parallel to the shaft, with adjacent edges of the casing and housing defining a line of separation in a plane transversely of the shaft, a handle assembly having a handle, a handle post, means securing the handle post to the casing adjacent said line of separation, and a hand-grip portion extending from the handle post along the casing toward the end opposite said housing, speed control mechanism mounted in one of said casing or housing and operatively connected to the motor for adjusting the speed of rotation of the motor shaft, a manually operable rotary control knob mounted adjacent the handle post on the side toward the housing for rotation on an axis substantially parallel to the motor shaft, cooperating portions on the removable housing and handle assembly retaining the control knob in position when the housing and casing are assembled, at least one of said cooperating portions being automatically disengaged from the knob when the housing and casing are separated, and means operatively connecting the control knob and speed control mechanism for adjustment of the motor speed by the knob.

5. A household appliance according to claim 4 in which the axis of rotation of the control knob is close to the surface of said casing and housing, with one of said casing or housing having a recess substantially enclosing and concealing the lower portion of the knob, and the major upper portion of the knob being exposed above said casing and housing for convenient access at both sides of said post.

6. A household appliance according to claim 5 in which the cooperating portion on the removable housing, the knob, and the handle post adjacent the knob all have their major upper surface portions formed as surfaces of revolution about said knob axis.

7. A household appliance according to claim 6 in which the upper surface portions of the knob, handle post and cooperating portion of the housing all merge smoothly and taper generally down toward the housing end of the appliance.

8. A portable household appliance comprising a motor casing having a motor and motor shaft extending longitudinally therein, a removable housing at one end of said casing, the housing and casing having cooperating parts adapted for engagement and disengagement of the housing and casing in response to relative movement in a direction parallel to the motor shaft, the housing and casing having mating edges defining a line of separation in a plane transversely of the motor shaft, a carrying handle having a handle post secured to the casing adjacent said line of separation on the casing side thereof, a governor control member inside the casing mounted for rotation substantially coaxially of the motor shaft, a rotary control knob mounted for rotation on an axis parallel to the motor shaft with a major portion of the periphery of said control knob extending outside the casing and manually accessible immediately adjacent the line of separation adjacent the handle post from both sides of said post, said governor control member and said knob having gear teeth thereon, an idler gear having teeth meshing with the gear teeth on both the governor control member and the knob, said idler gear being mounted for rotation on an axis parallel to the motor shaft, said handle post having a recessed portion adjacent the line of separation in which the idler gear and control knob teeth are enclosed and concealed, supporting shafts for the control knob and idler gear, and cooperating portions on the handle post, housing and casing retaining the control knob and idler gear in operative position on their shafts when the housing and casing are assembled, said cooperating portions being automatically disengaged for ready removal of the knob and gear when the housing and casing are separated.

9. A portable household appliance according to claim 8 in which the governor control member and idler gear shaft are secured to the motor casing and the control knob shaft is secured to the removable housing.

10. A household food mixer comprising a motor casing member having a motor shaft therein, a gear housing member at one end of the motor casing, said gear housing and motor casing having cooperating parts adapted for engagement and disengagement of the housing and casing in response to relative movement in a direction parallel to the shaft, the line of separation between the housing and casing extending transversely of the shaft, a handle attached to the motor casing and having a hand-grip portion generally parallel to the motor shaft and a handle post extending from the hand-grip portion to the motor casing adjacent said line of separation, a bearing portion on said handle post for supporting at least one end of a control shaft parallel to the motor shaft, a second bearing portion on the gear housing for supporting another portion of a control shaft, a control shaft substantially parallel to the motor shaft and supported in said bearing portions, a manually rotatable control knob mounted on the shaft, motor speed control means in one of said casing and housing members, means operatively connecting said control knob and speed control means, and said control knob and control shaft being held in position between the bearing portions when the casing and housing are assembled and being accessible for removal when the casing and housing are separated.

11. A food mixer according to claim 10 in which one end of the control knob shaft is threaded into the bearing portion on the removable gear housing and in which the handle post has an opening coaxially of the control knob shaft in which the other end of the control knob shaft is received when the casing and housing are assembled.

12. A food mixer according to claim 11 in which the opening extends all the way through the handle post, for removal and insertion of the control knob and its shaft when the housing and casing are fully assembled.

13. A food mixer according to claim 10 in which the face of the handle post toward the gear housing end is substantially flat and lies in the same plane as the transverse line of separation between motor casing and gear housing, and in which the handle post bearing portion, second bearing portion and control shaft are located outwardly of the casing thereby exposing more than half of the periphery of the control knob, said exposed periphery of the knob being accessible at both sides of the post and having a range of mixer speed indicia thereon whereby speed indicia in the range adjacent a particular speed setting are readily visible to the user.

14. A household food mixer comprising a motor casing member having a motor shaft therein, a gear housing member at one end of the motor casing, said gear housing and motor casing having cooperating parts adapted for engagement and disengagement by relative movement in a direction parallel to the shaft, the line of separation between the housing and casing members extending transversely of the shaft, a handle post retaining member projecting transversely from the motor casing adjacent said line of separation, a bearing portion on said handle post retaining member for supporting at least one end of a control shaft parallel to the motor shaft, a second bearing portion on the gear housing for supporting another portion of a control shaft, a control shaft substantially parallel to the motor shaft and supported in said bearing portions, a manually rotatable control knob mounted on the shaft, motor speed control means in one of said casing and housing members, and means operatively connecting said control knob and speed control means when the knob, shaft, housing and casing are assembled, said control shaft being automatically disengaged from at least one of said bearing portions in response to relative movement of said housing away from said casing parallel to the motor shaft.

15. A food mixer according to claim 14 having a handle comprising a hand grip portion generally parallel to the motor shaft and front and rear handle posts, interengaging means on the front handle post and on the handle post retaining member preventing lateral removal of the handle and locating the handle post immediately adjacent the retaining member on the side opposite the control knob, said interengaging means being engaged and disengaged by relative movement of the handle toward and away from the retaining member and parallel to the motor shaft, and locking means normally preventing said relative movement when the parts are assembled.

References Cited in the file of this patent

UNITED STATES PATENTS

| | | |
|---|---|---|
| 1,871,274 | Nielsen | Aug. 9, 1932 |
| 2,037,890 | Dow | Apr. 21, 1936 |
| 2,247,708 | Jordan | July 1, 1941 |
| 2,277,034 | Bisley | Mar. 24, 1942 |
| 2,333,521 | Clark et al. | Nov. 2, 1943 |
| 2,477,150 | Snyder et al. | July 26, 1949 |
| 2,557,765 | Robertson | June 19, 1951 |
| 2,569,259 | Purpura | Sept. 25, 1951 |